Jan. 29, 1957 D. T. N. WILLIAMSON 2,779,654

GRAPHICAL RECORDING SYSTEMS

Filed Nov. 2, 1950 4 Sheets-Sheet 1

Inventor:
David T. N. Williamson
By Cushman, Darby & Cushman
Attys.

Jan. 29, 1957 D. T. N. WILLIAMSON 2,779,654

GRAPHICAL RECORDING SYSTEMS

Filed Nov. 2, 1950

4 Sheets-Sheet 2

Inventor:
David T. N. Williamson
By Cushman, Darby & Cushman
attys.

Jan. 29, 1957 D. T. N. WILLIAMSON 2,779,654

GRAPHICAL RECORDING SYSTEMS

Filed Nov. 2, 1950 4 Sheets-Sheet 3

Inventor:
David T. N. Williamson
By Cushman, Darby & Cushman
attys.

Jan. 29, 1957 D. T. N. WILLIAMSON 2,779,654

GRAPHICAL RECORDING SYSTEMS

Filed Nov. 2, 1950

4 Sheets-Sheet 4

United States Patent Office 2,779,654

Patented Jan. 29, 1957

2,779,654

GRAPHICAL RECORDING SYSTEMS

David Theodore Nelson Williamson, Hollinwood, England, assignor to Ferranti Limited, Hollinwood, England, a company of Great Britain Application November 2, 1950, Serial No. 193,618

Claims priority, application Great Britain November 8, 1949

3 Claims. (Cl. 346—33)

This invention relates to graphical recording systems of the kind in which intelligence capable of graphical representation is converted into electrical signals which have a characteristic thereof appropriately modulated and such signals are then so applied to a recorder as to effect a permanent visible record of the intelligence upon a convenient medium, such as paper.

Particular, although by no means exclusive applications, of this invention are to the provision of a high speed type-reproducing telegraph system, for example, a teleprinter, or the provision of a high speed recorder of electric or other waveforms of the amplitude/time type, or the provision of a system for the facsimile transmission and recording by reproduction of graphs, diagrams, pictures and the like, subject to certain limiting factors which will be apparent hereinafter.

Although many such permanent visible recording systems are known, they have either or both of the disadvantages of not providing a record which can be immediately examined or of involving the use of mechanically moving parts whose inertia renders them incapable of recording high-frequency signals or transients. For example, a cathode ray oscilloscope may be used and its trace recorded photographically; apart from the inability to effect immediate examination of the record, such system is expensive.

The general object of the present invention is to provide a graphical recording system which is cheap to use, whose permanent visible record can be examined immediately after production and whose speed of recording is not limited by the inertia of mechanically moving parts.

A particular object of the invention is to provide a system for graphically recording intelligence upon electro-or thermo-responsive material which includes a plurality of stylus members each arranged to influence at any given instant of time a different area unit of said material for causing such engaged area unit to respond visibly when the associated stylus member is appropriately energised electrically, individual selectively responsive means for each of said stylus members for providing effective electrical energisation of such member, said selectively responsive means each being responsive to an applied electrical oscillation at a frequency individual to said member, signal-deriving means for deriving electric signals characteristic of the intelligence to be recorded, said signals comprising a plurality of different frequencies capable of producing effective energisation through its associated selectively responsive means of those of said stylus members whose energisation is necessary to produce the required recording of the intelligence and means for applying said signals to all of said selectively responsive means.

Another object of the invention is to provide an improved method of transmitting and graphically recording intelligence which comprises the steps of converting such intelligence into an electric signal comprising a plurality of electric oscillations at different frequencies, each frequency being characteristic of a predetermined position of the eventual graphical record, separating each of said different frequencies of said composite-frequency signal into individual single frequency channels and utilising the resultant selective energisation of such channels to energise individual stylus members each located at a position with respect to electro- or thermo-responsive recording material predetermined by the individual response frequency of the associated channel so as to produce at the positions of such energised stylus members a visible marking of said material.

A further object of the invention is to provide improved apparatus for providing a graphical record of intelligence characterised by an electric signal comprising a plurality of electric oscillations at different frequencies predetermined in accordance with the positions of separate discrete areas of the required graphical reproduction, which comprises means for moving a sheet of electro- or thermo-responsive material past a recording position, a plurality of stylus members disposed at said recording position to influence said sheet at spaced intervals transverse to the direction of movement of said sheet, a plurality of frequency-selective circuit means, means connecting individual ones of said circuit means to individual ones of said stylus members for providing energisation of each of said stylus members only by an oscillation of its individual frequency and means connecting each of said frequency-selective circuit means to common input terminals for receiving said signal.

The electro- or thermo-responsive material may be arranged so as to be moved relative to the stylus members during recording, in which case such members may be arranged so that the respective area units influenced by each form, at any given instant, a single row line of discrete units extending transversely to the direction of movement of the material. Alternatively such material may be held stationary during recording and moved relatively to the stylus members only during the intervals between recording separate items of intelligence, in which case said stylus members may be so arranged that the respective area units influenced by each form either a single row line or a two-dimensional mosaic of discrete units.

A further object of the invention resides in the provision of apparatus for recording a waveform of the amplitude/time type wherein the signal-deriving means includes frequency-modulating means for converting the amplitude variations of the applied waveform into frequency variations the frequency range of which is such as to provide recording of the waveform to the desired amplitude scale and wherein means are provided for moving the electro- or thermo-responsive material transversely past a line of stylus members at a speed suitable for providing a time axis of the desired scale.

Yet a further object of the invention is to provide apparatus for recording intelligence in the form of a series of symbols of typographical or like kind or a graph, diagram, picture or the like which includes signal-deriving means comprising, for each individual stylus member, a corresponding electrical frequency determining circuit arranged to supply, under the control of a switching device individual to that circuit, an oscillatory voltage having a predetermined frequency related to the frequency of the selectively responsive means of such stylus member, and selective combining means controlled by or dependent upon the intelligence to be recorded, for producing operation of that combination of said switching devices as will cause the supply of oscillatory voltages at those frequencies necessary to produce eventual energisation of the relevant stylus members.

When the intelligence concerned is represented by chosen ones of a series of symbols of typographical or like kind, such selective combining means may comprise, for each symbol a single control for effecting or permitting simultaneous or sequential operation of the required combination of switching devices.

Alternatively for dealing with intelligence represented by a graph, diagram, picture or the like, such switching devices may each be photo-emissive surfaces assembled in a similar configuration to that of the area units associated with the corresponding stylus members, said selectively combining means comprising means for causing an image of said graph, diagram, picture or the like to scan the assemblage of photo-emissive surfaces where the area units are in the form of a line, or means for projecting an image of said graph, diagram, picture or the like onto the assemblage of photo-emissive surfaces where the area units form a two-dimensional mosaic.

In order that the above and other objects and features of the invention may be more readily understood a number of embodiments will now be described by way of illustrative example with reference to the accompanying drawings in which.

Figure 1:
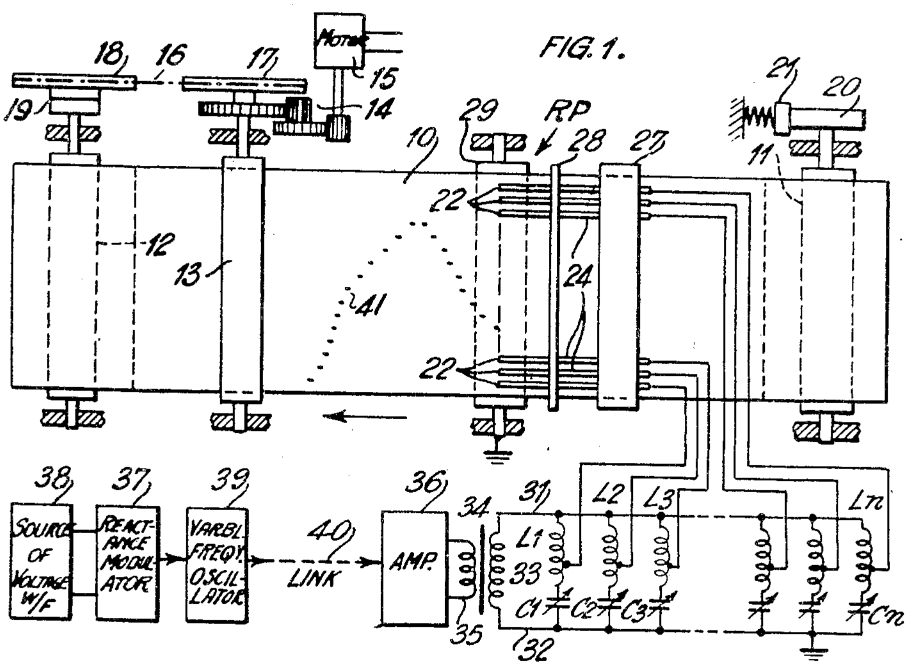
Fig. 1 is a partly diagrammatic partly-schematic view showing one arrangement for graphically recording intelligence constituted by a waveform of the amplitude/time variety.
Figure 2:
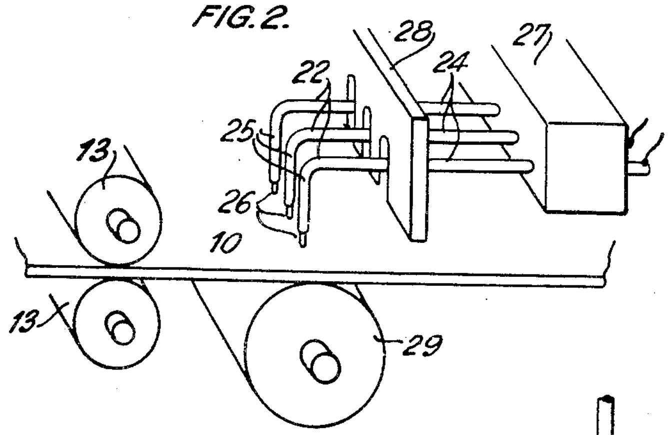
Fig. 2 is a fragmentary perspective view of a part of a device used in the embodiment of Fig. 1.

Referring first to the embodiment shown in Figs. 1 and 2 which illustrate an arrangement for graphically recording intelligence in the form of a waveform of the amplitude/time type, there is provided a sheet or ribbon 10 of electro-responsive paper such as that known under the Trademark "Teledeltos" which responds to voltages within a suitable critical range to conduct an electric current therethrough causing darkening or discoloration. This paper ribbon 10 is passed from one reel 11 to a second reel 12 by means of a feed arrangement comprising two parallel feed rollers 13 disposed transversely of the ribbon and providing therebetween a pressure nip through which the ribbon passes. The feed rollers 13 are driven at a suitable constant speed through gearing 14 by an electric motor 15. Suitable means, such as a belt or chain drive 16 between a pulley 17 on the spindle of the lower roller 13 and another pulley 18 on the spindle of the reel 12 is provided for rewinding the ribbon 10 on to the reel 12. A friction clutch 19 is associated with the pulley 18 to prevent excess rewinding tension. The opposite reel 11 may be provided with a friction brake drum 20 and a spring urged braking block 21 to maintain the ribbon 10 in an appropriately taut condition.

Intermediate the reels 11 and 12 the ribbon 10 passes a recording position RP constituted by a row of equally spaced styli 22. As shown more clearly in Fig. 2 each stylus 22 consists of an electrical conductor 24 having a downwardly bent end 25 which is provided at its lower extremity with a platinum or tungsten tip 26. Towards their opposite ends each of the stylus conductors 24 is rigidly secured in an insulated holder bar 27 while a comb 28 of insulating material located parallel to the holder bar 27 but nearer to their ends 25, serves accurately to locate such ends of such conductors so that at any given instant the tip 26 thereof engages an individual area unit of the paper ribbon 10 by lightly pressing the latter against the surface of a co-operating conductor located on the opposite, under, side of the paper. The co-operating conductors for each of the styli are conveniently combined as a single electrically conductive and rotatable roller 29 but such co-operating conductors may, obviously, comprise a common stationary flat metal plate while a plurality of short rollers or narrow plates one for each stylus may be used instead of a composite one-piece structure. The combination of each stylus and the co-operating conductor on the other side of the paper constitutes what will hereinafter be termed a "stylus member."

At any given instant the area units lying in the immediate vicinity of each tip 26 form a line of discrete area units extending transversely to the direction of movement of the paper. Suitable electrical energisation of any stylus member by the application of a sufficient voltage between the stylus 22 and its co-operating conductor 29 results in the passage of a current through the engaged area unit of the paper which in turn causes it immediately to be activated so as to respond visibly and, preferably, permanently by darkening or otherwise changing colour.

Each stylus member has individually associated therewith a frequency discriminating circuit in the form of a series-connected oscillatory circuit of an inductance L1, L2 . . . L*n* in series with a presettable capacitor C1, C2 . . . C*n*. The connection from the relevant stylus conductor 24 to the associated inductance is conveniently made to a stepped down tapping on the latter as shown for power transfer efficiency. Each series-connected circuit L1, C1 . . . L*n*, C*n* thus constitutes a selectively responsive means having a response frequency which is individual to the associated stylus member. The response of the circuit to sufficient excitation at its resonance frequency causes effective energisation of the associated stylus member with resultant marking of the paper ribbon 10. By effective energisation is meant energisation sufficient to cause the paper to respond visibly. Each tuned circuit will, of course, respond to some extent to excitation at a frequency other than the one to which it is tuned but the equipment is so designed that such energisation is not effective in this sense. It is possible to arrange that conduction through the individual stylus takes place over a narrower range of frequencies than that to which the tuned circuit itself responds. If the sheet or ribbon of electro-responsive material is of the type referred to above as known under the trademark "Teledeltos," the tuned circuits are not heavily loaded thereby and therefore work at a suitably high "Q" value. The material has a fairly critical conducting voltage, conduction beginning when a certain minimum voltage has been exceeded and ceasing at a slightly lower voltage. Conduction through the stylus takes place over a smaller range of frequencies than that to which the tuned circuit itself responds. The stylus being connected directly to the tuned circuit, the "Q" of the tuned circuit has therefore the value proper to the unloaded circuit rather than the value which obtains when current is passing through the stylus. The property above referred to may be employed to improve the resolution of the recorder since a large number of tuned circuits may be used tuned to closely adjacent frequencies.

All of the resonant response circuits, which may for convenience be referred to as recording circuits, are connected in parallel between a pair of busbars 31, 32, one of which 32 is earthed as is also the roller 29. The busbars 31, 32, are connected across the secondary winding 33 of a transformer 34 whose primary winding 35 is connected to and supplied with the output of an amplifier 36.

The values of the individual frequencies to which the recording circuits are tuned preferably form an arithmetic series over a frequency range of from, say, 1 to 2 mc./s. The arrangement of the styli is such that the frequencies associated with them form the aforesaid arithmetic series from one transverse side of the paper ribbon 10 to the other.

The number of styli provided depends upon various factors. Besides the number of different frequencies used and their relative spacing, already referred to above, other limiting factors are the width of the paper sheet or ribbon, the permissible band width of the signals and signal frequencies which are employed, the extent to which the marking response of the paper spreads beyond the individual area unit of the tips 26 of the styli and so on. Obviously the greater number of styli that can be used within the imposed limitations the more accurate will be the reproduction of the recorded intelligence.

The amplifier 36 is provided with its operating signal from some convenient form of signal-deriving means of the frequency-modulation type whereby the amplitude variations of the waveform which is to be recorded are converted into frequency variations of a voltage to the same time scale. As shown schematically in Fig. 1, these means may, when the waveform to be recorded is already a voltage, comprise a reactance modulator valve 37 which is supplied with its controlling input from a source 38 of the voltage waveform to be recorded and which itself controls the operating frequency of a variable frequency oscillator 39 from which the frequency modulated output is fed to the amplifier 36 by way of a suitable link 40.

It is convenient to regard the derived voltage from the signal-deriving means as consisting of a number of sequential signals each of which has a frequency such as will actuate at a particular amplitude level the responsive means of only a particular and relevant one of the stylus members, that is to say, is such as to cause at that amplitude level sufficient response of the tuned circuit L1, C1 . . . L*n*, C*n* associated with the stylus member whose energisation is required to record that amplitude level on the paper. Each signal thus represents, one stylus member and the corresponding single activated area unit on the recording paper.

In the operation of the above described arrangement the motor 15 is set into operation so as to move the paper strip 10 steadily past the recording position RP of the line of styli 22 the tips 26 of which remain in light contact with the paper to press it against the co-operating roller 29. At the same time the voltage waveform which is to be recorded from source 38 is applied to the reactance modulator valve 37 to produce a frequency-modulated oscillatory signal from the oscillator 39 which is then applied over link 40 to the amplifier 36 and thence through transformer 34 to the busbars 31, 32, and so to all of the tuned circuits L1, C1, L2, C2 . . . L*n*, C*n*. This signal is composed of a plurality of different frequencies which correspond to the sequential amplitude levels of the voltage waveform which is to be recorded and the strength of the signals and the parameters of the equipment, e. g. the amplification provided by the amplifier 36 and the loading set by the tapping on the inductances L1, L2 . . . is such that each recording circuit responds sufficiently to cause effective energisation of the associated stylus member in answer to each signal that represents that stylus member. For example, the existence of the input voltage waveform at its zero amplitude value would produce an output frequency from the oscillator 39 such as would resonate with the circuit L1, C1 only and accordingly would cause effective energisation only of the lowermost stylus member at the recording position. Similarly, the existence of the voltage waveform at its maximum amplitude level would produce an output frequency from the oscillator 39 such as would resonate with the tuned circuit L*n*, C*n* associated with the uppermost stylus member of the group and cause effective energisation only of that member. Similarly, for intermediate amplitude levels there will be produced corresponding frequencies at intermediate values which in turn cause effective energisation of a selected one of the intermediate stylus members. Consequently, as the input voltage waveform varies so the output signal frequencies from the oscillator 39 also vary and the location with respect to the width of the paper of each successively responding stylus member similarly varies to provide a reproduced image as shown at 41 in Fig. 1.

The amplitude and time scales of the reproduced waveform depend respectively upon the frequency range of the modulation of the oscillator 39 and the speed of movement of the ribbon 10 by the motor 15. In order to ensure that the frequency of the derived voltage accurately follows the amplitude variations, a negative feedback system of any convenient type may be used to stabilise the oscillator 39.

The waveform is thus recorded cheaply and accurately and the record is available for examination immediately after its production if required. Furthermore, the speed of recording is not limited by the inertia of mechanically moving parts since the only mechanical movement is that of the paper 10 which takes place, in this embodiment, at a steady speed.

Where the waveform or equivalent variation with time which is to be recorded is not itself a voltage as assumed above, any suitable means may be utilised for converting such variation with time into a variable voltage for controlling a variable frequency oscillation generator or, in some cases, directly into a variable frequency oscillation. For example, where the waveform is that of a physical pressure or a mechanical movement an oscillatory circuit associated with a variable frequency oscillator may again be used and some relatively simple form of linkage may be adopted whereby the pressure variations cause a mechanical variation of some tunable component of the oscillatory circuit.

Figure 3:
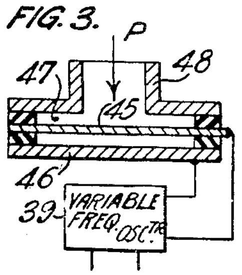
Figs. 3 and 4 are fragmentary diagrams showing alternative arrangements for deriving an oscillation which is frequency modulated in accordance with a fluid pressure or a mechanical movement.
Figure 4:
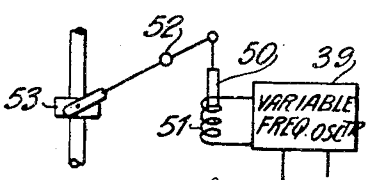

Figs. 3 and 4 illustrate examples of such arrangements. In Fig. 3, part of the capacitance of the frequency-determining circuit of the variable-frequency oscillator 39 is constituted by that existing between a flexible diaphragm 45 and a closely spaced electrode 46. Fluid pressure variations P are applied to one face of the diaphragm by way of chamber 47 and connection 48 whereby the resultant variation of spacing between diaphragm 45 and electrode 46 produces related capacitance changes which result in similar frequency modulation of the oscillator output. Fig. 4 shows a mechanical waveform device in which a movable permeability controlling core 50 associated with an inductance 51 of the frequency-determining circuit of the oscillator 39 is moved into and out of the inductance by a linkage system 52 actuated by a reciprocating element 53 whose waveform of movement is to be recorded.

Variations or waveforms of other kinds may similarly have their amplitude changes converted to frequency variations of an oscillatory voltage in any convenient manner.

If the waveform to be recorded does not produce a sufficiently large variation in the frequency of an oscillator working over the range which is effective on the recording circuits L1, C1 . . . L*n*, C*n* such waveform may be used instead to control the frequency of another oscillator operating at a suitably higher frequency, e. g. at V. H. F. which accordingly develops an increased change of response frequency in answer to small capacitance or inductance variations.

Figure 5:
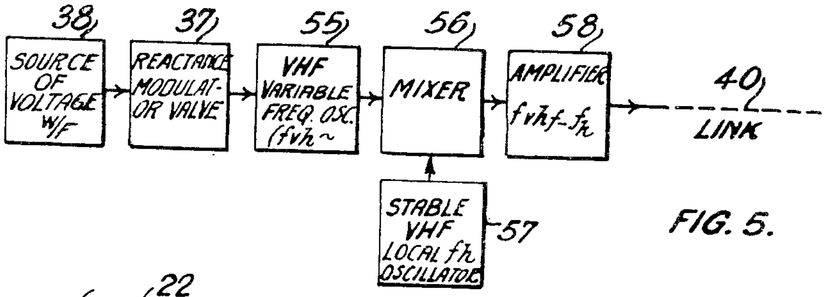
Fig. 5 is a further fragmentary diagram showing a modified arrangement for deriving a frequency-modulated oscillation.

Fig. 5 shows such an arrangement in which the reactance modulator valve 37 supplied with the waveform from source 38, controls the operating frequency of a very-high-frequency oscillator 55. The frequency modulated output of the latter is then heterodyned in mixer circuit 56 with another and very stable high frequency oscillation from local oscillator 57, the respective frequencies of operation of the two oscillators 55 and 57 being such that resultant lower range of beat-frequencies lies within the operational frequency range of the recording circuits and has the required relatively large variation of frequency. These lower-beat frequencies, after selection and amplification in circuit 58 are fed over link 40 as before.

More than one waveform may thus be recorded simultaneously, one oscillator being employed for each and the outputs of the plurality of oscillators being applied to the common amplifier 36 of the recorder.

The arrangements described above admit of various modifications that will readily become apparent. For example, the styli need not be equally spaced across the paper and the frequency values need not necessarily form an arithmetic series. If, however, the waveform is to be recorded without distortion there must clearly be a consistent relationship between these factors, any irregularity in the spacing of the styli being compensated for by a similar irregularity in the spacing of the associated frequency in the frequency series. This is, of course, assuming that the frequency variations accurately follow the amplitude variations of the applied waveform. Should there be any constant distortion in this respect it may be corrected by a corresponding irregularity of either the physical spacing of the styli or of the frequency spacing of the recording circuits.

Figure 7:
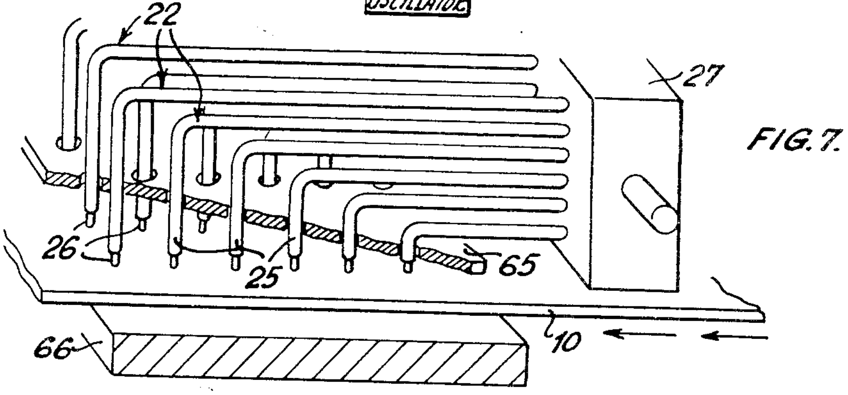
Fig. 7 is a fragmentary perspective view, similar to Fig. 2, of the stylus members of the embodiment of Fig. 6.
Figure 8:
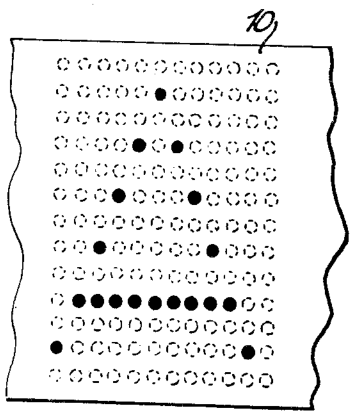
Fig. 8 is a view illustrating the field area dealt with at each operation of the arrangement of Figs. 6 and 7 and showing the manner of reproduction.
Figure 6:
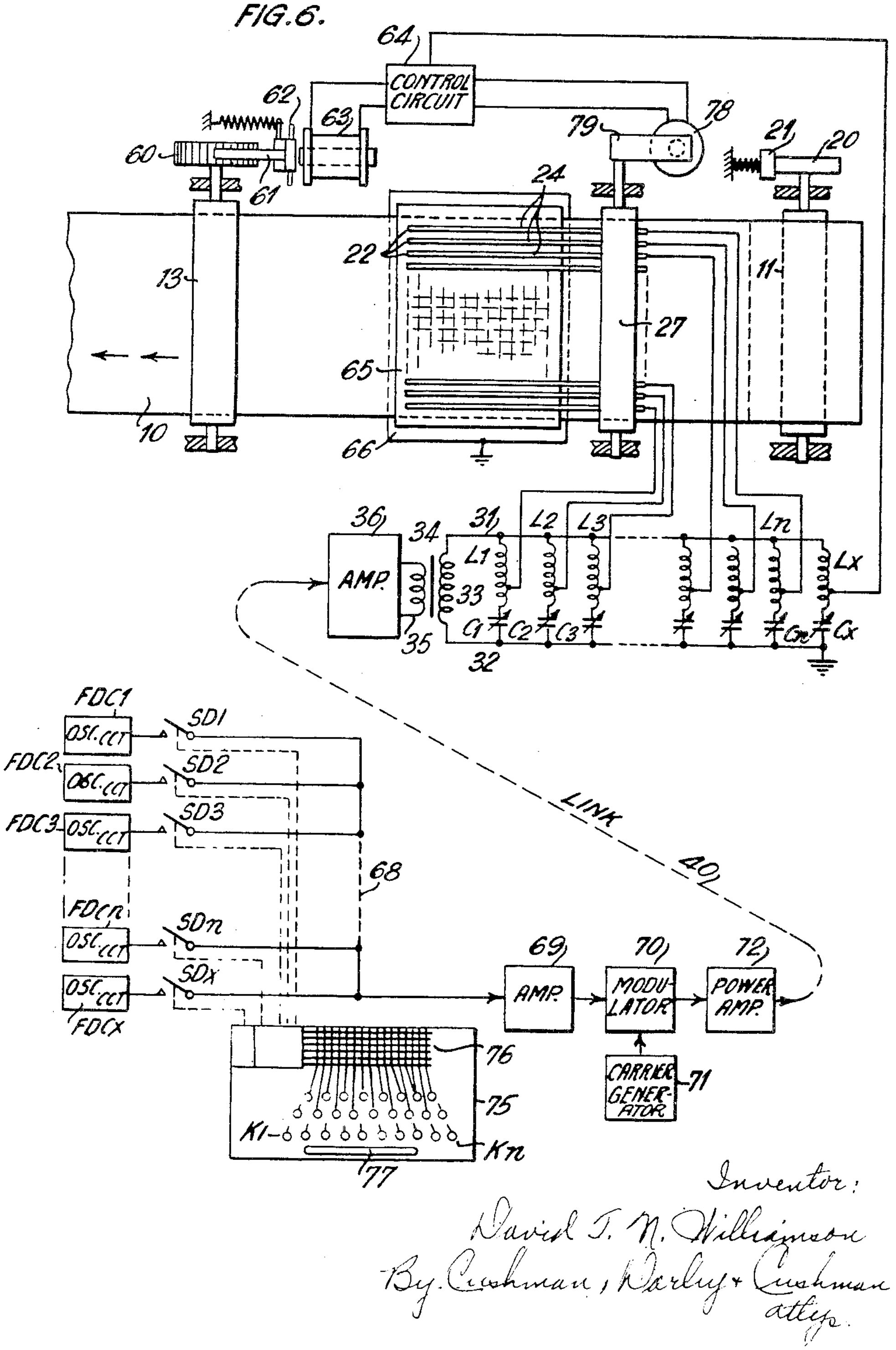
Fig. 6 is a view similar to Fig. 1 illustrating the application of the invention to a high speed type reproducing telegraph system, for instance to a teleprinter.

Another embodiment of the invention is shown in Figs. 6, 7 and 8 in the form of a high-speed type-reproducing telegraph system, for example a teleprinter. The intelligence transmitted and recorded in this example is composed of separate items each covering a two-dimensional field area such as a letter of the alphabet, a numeral, an algebraic or other symbol, or the like, for each of which the term "symbol" will hereinafter be used.

In this embodiment the styli 22 are arranged, as shown more clearly in Figs. 7 and 8, so that the individual area units of the recording material which they engage at any given instant form a rectangular mosaic rather than a straight line, the required two-dimensional image being marked by energisation of suitable selected ones of the stylus members either simultaneously or sequentially within a given period of time during which the recording material is held stationary. The various stylus conductors 24 are arranged in banks dealing respectively with successive vertical columns of the mosaic area, all of the conductors being held in separately insulated manner in the holder bar 27 and connected as before one to each of one of the resonant recording circuits L1, C1, L2, C2, . . . L*n*, C*n*. For convenience the respective response frequencies of the various stylus members is arranged as an arithmetic series, subdivided into groups each dealing with a separate vertical column of the mosaic. This is not essential however and in some circumstances, e. g. for the purpose of secrecy of transmission, the respective response frequencies may be selected according to a prearranged code. The comb 28 of the first embodiment is replaced in this instance by a perforated locating plate 65. The co-operating conductors are conveniently joined together in this instance in the form of a flat metal plate 66 connected to earth.

As shown in Fig. 6 the recording material is again a paper ribbon 10 fed from a reel 11 intermittently by an amount at least equal to and preferably slightly greater than the corresponding width dimension of the mosaic area of the stylus members. This intermittent feed is shown effected by feed rollers 13 which are intermittently rotated through ratchet-wheel 60 by pawl 61 on oscillating armature 62 operated by electro-magnet 63 energised at intervals by control circuit 64.

The signal-deriving means of this embodiment takes the form of a plurality of frequency-determining circuits FDC1, FDC2 . . . $FDC_n$, one for each stylus member and each tuned to the same individual frequency to which the recording circuit associated with that member is tuned. These frequency-determining circuits, which may conveniently be regarded as coding circuits, or coding oscillators, may each comprise a separate oscillation generator the output of which is connected by way of an individual switching device $SD_1$, $SD_2$ . . . $SD_n$, to a common output lead 68. This lead may be connected directly by way of link 40 to the amplifier 36 feeding the busbars 31, 32. When, as will usually be the case with this embodiment, transmission to a distant point is required, then the lead 68 is conveniently connected through an amplifier 69 to a modulator circuit 70 also supplied by a carrier-wave oscillation generator 71. The output from the modulator 70 is amplified in power amplifier 72 and then fed over link 40 to the recorder. The link 40 may be either a direct cable or a radio link. It will be understood that the amplifier 36 may also contain suitable demodulating equipment if the frequencies of transmission over the link 40 are not the same as those of the recording circuits in the recorder.

In this arrangement any desired pattern of dots within the rectangular mosaic formed by the tips of the styli 22 may be produced by either simultaneously or sequentially closing those switches SD1 . . . $SD_n$ of the frequency-determining circuits or coding oscillators FDC1 . . . $FDC_n$ corresponding to the stylus members relevant to that pattern; Fig. 8 shows the letter "A" thus reproduced.

The control or coding of the switching devices SD1, SD2 . . . $SD_n$ may be effected simultaneously by the operation of a single control such as a selected one of the keys K1 . . . $K_n$ of a typewriter keyboard 75 which operates the required combination of switches necessary for the energization of the relevant stylus members through mechanism indicated schematically at 76 and resembling in construction that commonly employed in teleprinter keyboards tape-perforators.

The selected switches SD1, SD2 . . . $SD_n$ may alternatively be operated sequentially. In this case the signals in the output lead 68 vary sequentially in frequency and only one frequency at a time is applied to the recorder busbars 31, 32. The equipment operates otherwise as before, except that longer time is required for the recording of each symbol.

In order to actuate the mechanism such as the control circuit 64 and magnet 63 as shown whereby the paper ribbon 10 is shifted after each symbol has been recorded so as to provide a fresh area of paper under the styli 22 a synchronizing signal may be transmitted between the signals representing each symbol. This signal may comprise a pulse at yet a further frequency and is, in the example shown, provided by the frequency-determining circuit $FDC_x$ under the control of switching device $SD_x$ which latter is controlled by the key return mechanism and also by the space-bar 77 of the keyboard 75. When applied to the busbars 31, 32 this frequency is resonant with the response circuit $L_x$, $C_x$ and provides an output potential which actuates the control circuit 64 which may be a trigger circuit. This signal may also be arranged to cause lifting of the styli 22 off the paper during the shifting movement to prevent frictional wear on the paper or on the styli, by arranging the holder bar 27 so as to be rockable by an electro-magnet 78 operating through an armature 79 secured to the bar 27.

Figure 9:
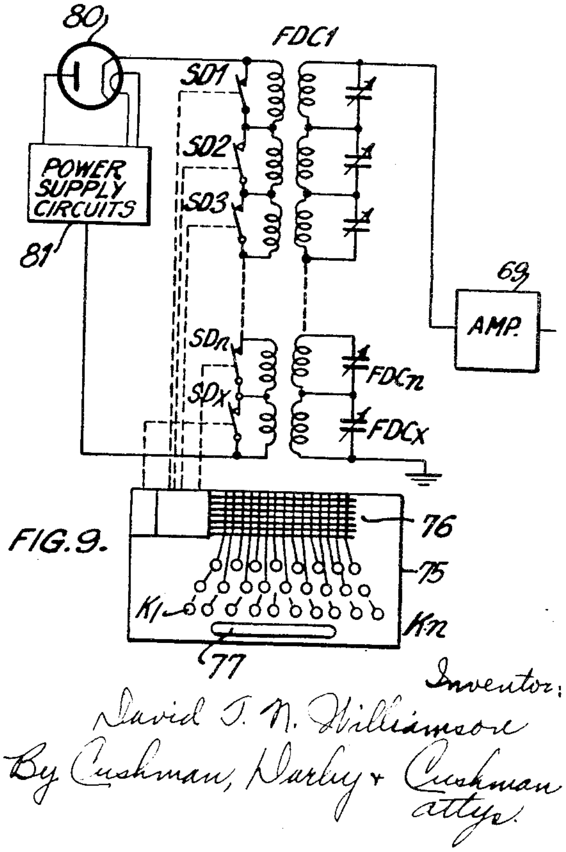
Fig. 9 is a diagrammatic view showing an alternative form of part of the arrangement of Fig. 6.
Figure 14:
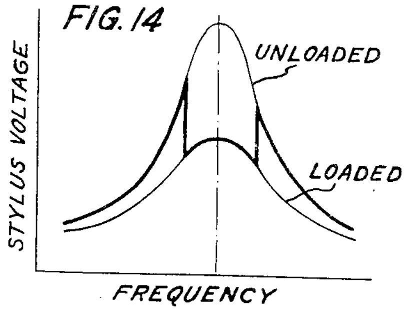

The coding oscillators or frequency-determining circuits FDC1 . . . $FDC_x$ may take various other forms, such as a number of oscillatory circuits tuned to the appropriate frequencies and shock-excited immediately prior to the coding of each symbol, or energized in other ways. Fig. 9 shows one form of this modification in which the shock excitation of the tuned circuits FDC1, FDC2 . . . $FDC_x$ is carried out by means of a temperature-limited diode 80 and its associated power supply circuits 81 acting as a noise generator by virtue of random electron flow. The switches SD1, SD2 . . . $SD_x$ in this instance, normally short circuit the tuned circuits which are not required and are accordingly arranged so as to be opened by operation of the appropriate key K1 . . . $K_n$ or bar 77 of the keyboard 75. This is not essential however and such a device as well as any other employing individual coding circuits may be rearranged so that any circuit is prevented from oscillating unless the corresponding switch is closed; the output connections may then all be connected to the output lead 68 direct.

The frequency of each coding oscillator or frequency determining circuit FDC1 . . . $FDC_x$ need not necessarily be the same as the tuned frequency of the recording circuit L1, C1 . . . $L_x$, $C_x$ of the corresponding stylus member, so long as it is converted to that frequency, for example by heterodyning, at some intermediate stage of the process. The frequency values to which the recording circuits are tuned need not form any regular series as long as no two frequencies are the same and so long as each is separated from the adjacent frequencies sufficiently to prevent adjacent circuits from responding appreciably to energization at its tuned frequency. Unlike the embodiments of Figs. 1 and 2 any irregularity in the spacing of these frequencies in the embodiments of Figs. 6–9 need not be compensated for by a similar irregularity in the spacing of the associated styli.

Where it is desired to narrow the bandwidth occupied by the signals, for example where the coding apparatus of the signal deriving means is at a distance from the recorder, each signal may be converted into a pulse which represents that signal's frequency by its timing with respect to an initiating pulse transmitted prior to the coding of each symbol. Each pulse (other than the initiating pulse) then represents one stylus member.

Figures 10, 11, 12, 13:
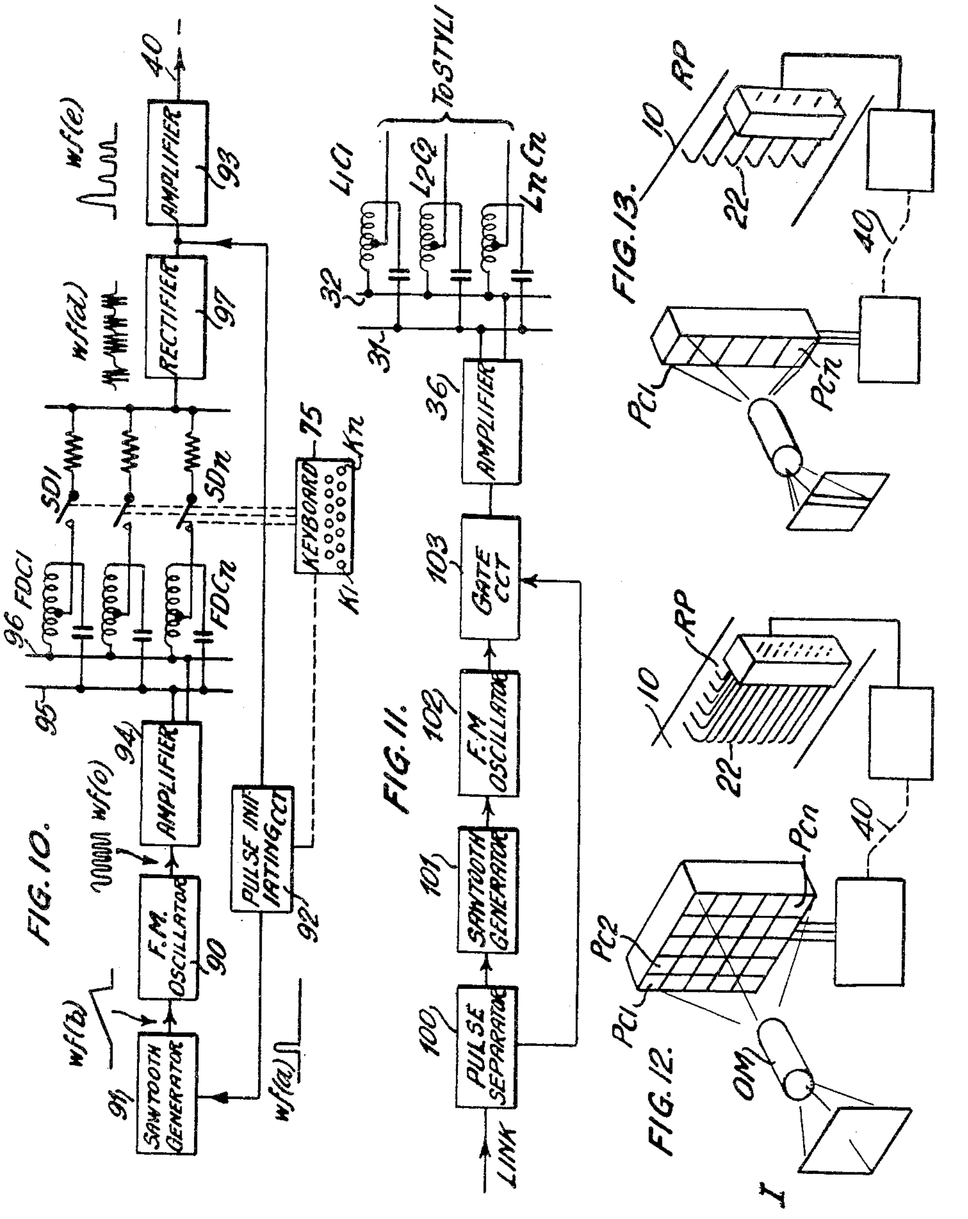
Fig. 10 is a block schematic diagram showing another alternative form of coding equipment.
Fig. 11 is a similar block schematic diagram of an alternative form of signal decoding equipment for use in conjunction with the arrangement of Fig. 10.
Figs. 12 and 13 are schematic views showing arrangements usable for facsimile recording and reproduction.

On embodiment for carrying out this system is shown schematically in Fig. 10 in which the coding equipment consists of a common oscillator 90 the frequency of which is controlled by a sawtooth generator 91 designed to produce a linear scan when triggered by an input pulse. An initiating pulse generator 92, arranged to be actuated when any key of the teleprinter keyboard 75 is pressed, is connected to the sawtooth generator 91 and to an amplifier 93. The oscillator 90 feeds an amplifier 94 which in turn supplies a pair of busbars 95, 96 between which are connected a number of series-connected inductors and capacitors forming a number of coding circuits FDC1, FDC2 . . . $FDC_n$ each of which corresponds to one of the stylus members of the recorder. These circuits are tuned to separate frequencies the values of which form an arithmetical or other series. Each frequency is not necessarily the same as that to which the corresponding circuit is tuned but its position in the series of frequencies is the same. The output from each coding circuit is connected through a switch SD1, SD2 . . . $SD_n$ to a common rectifier 97 which also feeds the amplifier 93 the output from which is transmitted to the recording equipment over link 40 which may be either line, radio or other form.

Fig. 11 illustrates one form of the co-operating recording equipment which comprises a pulse separator 100 having two output leads one of which carrying only the initiating pulses of each series is connected to a combination of sawtooth generator 101 and oscillator 102 similar to that of the coding equipment. The output of the oscillator 102 is fed through a gate circuit 103 to the amplifier 36, recording circuits L1, C1 . . . $L_n$, $C_n$, and styli 22, arranged as in Fig. 6. The second output lead from the pulse separator 100 carrying all the pulses of each series or train is connected direct to the gate circuit 103.

In operation, the actuation at the control point (Fig. 10) of any key K1 . . . $K_n$ to record a certain symbol codes the symbol as before by closing all the switches SD1, SD2 . . . $SD_n$ associated with the coding circuits FDC1, FDC2 . . . $FDC_n$ corresponding to the relevant stylus members 22 of the recorder. At the same time, or after a slight delay, a pulse is generated by the initiating pulse generator 92. This pulse is passed out to the link 40 through amplifier 93 and to the sawtooth generator 91. In the latter it initiates a linear scan, which causes the oscillator 90 to scan sequentially the full frequency range of the coding circuits FDC1 . . . $FDC_n$. Each of these responds sequentially, but the output of only those whose switches SD1 . . . $SD_n$ are closed passes out to the rectifier 97. The oscillations at different frequencies thus passed out are converted by the rectifier 97 into uniform pulses, which are in fact the envelopes of the oscillations produced by the several coding circuits. These pulses follow sequentially after the original initiating pulse and represent the frequencies of the originating coding circuits—and hence the relevant stylus members—only by their spacing in time from the initiating pulse of the series. This combined signal, comprised as it is of substantially uniform pulse signals, naturally occupies a narrower frequency bandwidth than that which would be required to accommodate all of the separate component frequencies if transmitted direct.

At the recorder (Fig. 11) the first part of the composite signal to arrive is the initiating pulse. This is passed by the pulse separator 100 to the sawtooth generator 101 where it initiates a linear scan in similar manner to the original coding equipment which in turn causes the oscillator 102 to begin to scan sequentially the full frequency range of the recording circuits L1, C1 . . . $L_n$, $C_n$. The pulse signals representing the actual symbol now arrive. These are deflected by the pulse separator 100 to the gating circuit 103 where each one causes the gate to open only during the time of that pulse; in the absence of a pulse the gate is closed. The oscillator output is thus applied to the recording circuits at sequential intervals only, starting from the initiating pulse, the spacing between these intervals being that between successive pulses. The oscillator frequency at each interval is such as to cause that recording circuit L1, C1 . . . $L_n$, $C_n$ to respond whose stylus member 22 corresponds to the coding circuit from which was derived the pulse located at that interval. The relevant stylus members thus become effectively energized sequentially to reproduce the appropriate symbol.

It will be appreciated that in this arrangement the signals applied to all the selectively responsive means constituted by the recording circuits L1, C1 . . . $L_n$, $C_n$ are not the actual signals derived (in the coding circuits) in respect of the intelligence but are further signals derived therefrom.

The arrangement just described may of course be modified in various ways, for example, the scans of the sawtooth generators need not be linear, since the rate of scan at the recorder merely effects the rate of reproduction from the stylus to stylus, provided of course that the pulses are spaced to suit.

As very much the same equipment is required at both the transmitter and the receiver either of them may be made to function as the other, provided of course that a keyboard and a mosaic of styli are supplied at each, thereby considerably reducing the apparatus required for a two-way signalling system.

It is emphasized that the tuned frequency of each coding circuit FDC1 . . . $FDC_n$ need not be the same as that of the corresponding recording circuit L1, C1 . . . $L_n$, $C_n$, since the former frequency disappears during the process of pulse conversion. The essential requirement is that the derived pulses should be so spaced relative to each other and to the initiating pulse as to cause eventual energization of the relevant stylus members. The tuned frequency of a coding circuit may however be said to represent that of the corresponding recording circuit where it does not equal it.

Each initiating pulse may be characterized by a greater amplitude than that of the ensuing signal pulses; in which case the pulse separator 100 may comprise an amplifier valve so biased beyond cut-off as to pass to the sawtooth generator only the initiating pulses.

In further embodiments of the invention the signal-deriving means of the recording system may be modified for use as a facsimile reproducer. In serveral forms of these the equipment is similar to that described above in connection with the type-reproducing telegraph systems of Figs. 6 to 11 except that the switching devices SD1, SD2 . . . $SD_n$ associated severally with the coding oscillators or frequency-determining circuits FDC1 . . $FDC_n$ now take the form of electronic switches of the photo-emissive type, for example photo-electric cells, assembled in a corresponding configuration to that of the stylus members 22, i. e. in line or mosaic. In each case the selectively combining means simply take the form of some arrangement for causing the light image of the graph, diagram, picture or other intelligence to scan or to be projected onto the assembly of photo-cells. Each illuminated cell acts in effect as the corresponding switch SD1, SD2 . . . $SD_n$ acted in the foregoing embodiments, allowing the output of the associated coding oscillator or circuit FDC1 . . . $FDC_n$ to pass to the recorder (either direct or after translation into another form) to cause energization of the stylus member 22 occupying the same position in the assembly of stylus members so that photo cell occupies in the assembly of photo cells. Reproduction of the light image is thus effected within limits depending largely on the number of styli or photo-cells in the assembly.

Fig. 12 shows schematically one arrangement using a mosaic assembly of cells and styli and in which a still image of the intelligence I is caused to fall by optical means OM upon a mosaic assembly of photo-cells Pc1 . . . $Pc_n$. The paper 10 under the recording styli 22 remains stationary during each recording operation. Where it is desired to narrow the transmitted frequency band the signals may be converted into spaced pulses exactly as described in connection with Figs. 10 and 11.

In an alternative arrangement as shown in Fig. 13 using a line assembly of photo-cells and styli the image may be caused to scan the single line Pc1 . . .$Pc_n$ of photocells in a direction transverse to the line. This may be effected by moving the intelligence I or by moving the optical means OM steadily. The recording paper 10 is moved at an equal speed transversely to the line of styli 22. If however it is desired to convert the signals in this last instance into spaced pulses the image may be scanned across the line of photo cells Pc1 . . . $Pc_n$ in a series of intermittent movements—the paper 10 moving similarly past the line of styli 22—and each time the image is stationary the strip of it that falls on the cells is, as it were, scanned in a frequency sense by a generator that sweeps through the frequencies of the various coding circuits under the control of a sawtooth oscillator as in Fig. 10. The outputs of only those circuits whose cells are illuminated are passed by way of the rectifier to the link with the recorder.

Other scanning arrangements, such as will readily occur to those versed in television systems, may alternatively by employed.

The intelligence recorded in this facsimile manner may of course be in the form of the symbols already referred to, the equipment being then in effect a teleprinter or the like. The image of the symbol may be caused to scan a line of photo cells or be projected onto a mosaic of them or be otherwise coded into the appropriate signals by photo-electric agency.

Modifications applicable to all the embodiments described include the following. The electro- or thermo-responsive paper may be in sheet form and its necessary movements in perpendicular directions effected as in a teleprinter. The paper may be caused to respond by HF heating rather than by the passage of current through it; each stylus then becomes an electrode with the cooperating conductor forming the other electrode. An advantage of this arrangement is that the styli need not touch the paper, which relieves the paper and the styli from wear when the paper is moved relative to the styli during the actual recording process or obviates the necessity for lifting the styli off the paper when it is moved only between the recording of separate items. The paper itself may be such as responds by electrolytic action when a current is passed through it. The cooperating conductors may be joined together in other forms than those of a roller or plate, or may be separate for each stylus. The styli may be tipped with other substances than platinum or tungsten that are not readily burned or corroded.

I claim:

1. A system for the high-speed graphical recording of intelligence represented by a waveform of the amplitude versus time type comprising, a sheet of electro-responsive material capable of being rendered conductive to give a visible response upon the application of a predetermined alternating voltage thereto, a row of stylus members each arranged in proximity to a different unit area of the sheet, means for moving the electro-responsive material transversely relative to row of stylus members at a speed suitable for providing a time axis of the desired scale, means for deriving from the amplitude variations of the applied waveform frequency-modulated signals having a range of frequencies suitable to provide recording of the waveform to the required amplitude scale, a plurality of frequency selective energizing circuits each comprising an oscillatory circuit tuned to a different frequency and one of said stylus members connected in direct energy transfer relation thereto, the said tuning frequencies each being related to a particular one of said derived signals such that each stylus member represents by virtue of its position a particular value of a variable component of the intelligence, and a receiving circuit for said derived signals connected in common to all of said oscillatory circuits and responsive to the receipt of said derived signals to apply to all of said oscillatory circuits signals whose frequencies lie within the range covered by said tuned circuits and which are representative of the different values of the said variable component of the intelligence.

2. In a system for the remote high-speed graphical recording of intelligence of the kind in which a sheet of electro-responsive material is moved past a recording position, the combination of means for deriving from the graphical intelligence to be recorded electric signals of different frequencies each of which is representative of a positional factor of a small unit area variable component of said intelligence, an array of stationary stylus members at said recording position each arranged in proximity to a different area unit of said sheet, a plurality of sharply frequency selective recording circuits each comprising an oscillatory circuit a separate one of said stylus members in direct energy transfer relation thereto and the proximate area unit of said sheet, each of said oscillatory circuits responding to a different frequency related to a particular one of the derived signals such that each stylus member represents by virtue of its position a particular area unit of the original intelligence, and a receiving circuit for said derived signals connected in common to all of said oscillatory circuits.

3. A system for graphically recording intelligence represented by a waveform of the amplitude versus time type comprising a sheet of material, a plurality of stylus members each disposed in proximity to a different unit area of said sheet, means for causing relative movement between the sheet and said stylus members to provide a time axis of a predetermined scale, means for deriving frequency-modulated signals from said waveform, a plurality of frequency selective circuits connected respectively to said stylus members and tuned respectively to different frequencies in the frequency range of said frequency-modulated signals, and means for coupling said signals to the frequency selective circuits in common, the arrangement being such that one of said stylus members causes a mark on said sheet in response to a frequency-modulated signal to represent an amplitude of said waveform.

References Cited in the file of this patent

UNITED STATES PATENTS

| | | |
|---|---|---|
| 907,235 | Herrick | Dec. 22, 1908 |
| 1,326,727 | Hammond | Dec. 30, 1919 |
| 1,711,137 | Brumder | Apr. 29, 1929 |
| 2,143,875 | Hansell | Jan. 17, 1939 |
| 2,148,578 | Pullis | Feb. 28, 1939 |
| 2,206,538 | Rhodes | July 2, 1940 |
| 2,213,886 | Potter | Sept. 3, 1940 |
| 2,465,976 | Goldsmith | Mar. 29, 1949 |
| 2,573,279 | Scherbatskoy | Oct. 30, 1951 |
| 2,637,024 | Lyman et al. | Apr. 25, 1953 |